(12) United States Patent
Takeichi et al.

(10) Patent No.: US 12,110,059 B2
(45) Date of Patent: Oct. 8, 2024

(54) AUTONOMOUSLY NAVIGATING VEHICLE

(71) Applicant: Honda Motor Co., Ltd., Tokyo (JP)

(72) Inventors: Masashi Takeichi, Saitama (JP); Kohei Matsuzawa, Saitama (JP); Takahide Konchi, Saitama (JP); Kenji Iseki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 564 days.

(21) Appl. No.: 17/537,497

(22) Filed: Nov. 30, 2021

(65) Prior Publication Data

US 2023/0166796 A1   Jun. 1, 2023

(51) Int. Cl.
| | | |
|---|---|---|
| *B62D 24/04* | (2006.01) | |
| *B60G 99/00* | (2010.01) | |
| *B62D 27/04* | (2006.01) | |
| *G05D 1/02* | (2020.01) | |
| *A01D 101/00* | (2006.01) | |
| *G05D 1/00* | (2006.01) | |

(52) U.S. Cl.
CPC ............ *B62D 24/04* (2013.01); *B60G 99/002* (2013.01); *B62D 27/04* (2013.01); *A01D 2101/00* (2013.01); *B60G 2204/128* (2013.01); *B60G 2204/16* (2013.01); *B60G 2300/08* (2013.01); *G05D 1/021* (2013.01)

(58) Field of Classification Search
CPC ...... A01D 34/64; A01D 34/81; A01D 34/008; A01D 34/82; A01D 67/00; B62D 27/04; B60G 99/002; B60G 2204/128; B60G 2204/16; B60G 2300/08; G05D 1/02
See application file for complete search history.

(56) References Cited

U.S. PATENT DOCUMENTS

| 2,335,054 | A | * | 11/1943 | Godwin | ................. | A01D 34/42 56/15.8 |
|---|---|---|---|---|---|---|
| 5,163,273 | A | * | 11/1992 | Wojtkowski | ............ | B60L 58/21 180/211 |
| 2010/0306932 | A1 | * | 12/2010 | Schneider | ............ | G05D 1/0227 15/325 |
| 2014/0373497 | A1 | * | 12/2014 | Bjorn | ................... | A01D 34/008 56/10.2 R |
| 2018/0116109 | A1 | * | 5/2018 | Matsumoto | ............ | A01D 34/78 |
| 2018/0222528 | A1 | * | 8/2018 | Jägenstedt | ........... | A01D 34/008 |

(Continued)

FOREIGN PATENT DOCUMENTS

WO       2017109879       6/2017

*Primary Examiner* — Abigail A Risic
(74) *Attorney, Agent, or Firm* — JCIPRNET

(57) ABSTRACT

A suspension mechanism has a tube member that is movably attached to an attachment shaft, a first attachment shaft retaining member provided on the chassis to swingably retain the attachment shaft with an outer peripheral surface of the tube member abutted on its inside surface, a shaft lower end portion of slip surface shape provided at lowermost part of the attachment shaft, a second attachment shaft retaining member provided on the chassis below the first attachment shaft retaining member and having a vertex equivalent section and a curve equivalent section to retain the attachment shaft with the slip surface shape shaft lower end portion abutted onto the vertex or curve equivalent section. The curve equivalent section is defined as a portion of a vertical cross section that passes through the vertex equivalent section is formed in an arc shape.

9 Claims, 7 Drawing Sheets

(56) References Cited

U.S. PATENT DOCUMENTS

| | | | |
|---|---|---|---|
| 2019/0310641 A1* | 10/2019 | Matsuzawa | G05D 1/02 |
| 2020/0000028 A1* | 1/2020 | Matsuzawa | A01D 34/008 |
| 2020/0170186 A1* | 6/2020 | Curtis | F16H 25/20 |
| 2020/0315087 A1* | 10/2020 | Svensson | A01D 34/008 |
| 2020/0367428 A1* | 11/2020 | Olsson | A01D 67/005 |

* cited by examiner

AUTONOMOUSLY NAVIGATING VEHICLE

BACKGROUND OF THE DISCLOSURE

Technical Field

The disclosure relates to an autonomously navigating vehicle, particularly to an autonomously navigating vehicle equipped with a suspension mechanism for connecting a chassis and a cover.

Related Art

An autonomously navigating vehicle of this type is equipped with a suspension mechanism that displaceably connects a chassis and a cover, and the present applicant also earlier proposed one in Patent Literature 1. According to the technology described in Patent Literature 1, a suspension mechanism is interposed in gravity axis direction between a chassis and a cover, and is attached to a lock member of the cover at one end and provided at another end with at least one attachment shaft to be attached to the chassis.

The present applicant also earlier proposed one in Patent Literature 2. According to the technology described in Patent literature 2, the autonomously navigating vehicle includes a chassis, a shaft connected to the chassis and cable of moving back/forth, left/right and up/down, and a cover connected to the shaft through a spherical joint. When an obstacle comes into contact with the cover during the vehicle is operating and a certain amount of external force is applied to the cover, the shaft moves in back/forth, left/right and up/down directions, as such obstacles are detected by the increase of distances between the magnet and the components provided in the chassis and shaft.

The disclose provides an autonomously navigating vehicle wherein a chassis and a cover are connected through a suspension mechanism, which is similar to that of Patent Literature 1 and Patent Literature 2.

LITERATURE OF RELATED ART

Patent Literature

Patent Literature 1: International Patent Application No. PCT/JP2015/85956
Patent Literature 2: US Patent Publication No. US 2019/0310641 A1

However, in the autonomously navigating vehicles described in Patent Literature 2, with respect to a retaining performance of the shaft, a cushioning performance at time of collision is decreased, since an angle formed of the contact surface of the chassis and the shaft are arranged nearly vertical, resulting that the retaining performance of the shaft and the cushioning performance at time of collision are not easy to be individually adjusted.

SUMMARY

According to an exemplary embodiment of the disclosure, an autonomously navigating vehicle, equipped with a chassis, a cover, and a suspension mechanism interposed between the chassis and the cover through a lock member at one end, and having at least an attachment shaft attached to the chassis at other end, which vehicle runs on drive wheels attached to the chassis, is provided. The suspension mechanism of the autonomously navigating vehicle includes a tube member that is movably attached to the attachment shaft; a first attachment shaft retaining member provided on the chassis to swingably retain the attachment shaft with the tube member; a shaft lower end portion provided at lowermost part of the attachment shaft; and a second attachment shaft retaining member provided on the chassis below the first attachment shaft retaining member to retain the attachment shaft. The second attachment shaft retaining member includes a vertex equivalent section and an inner surface defined as a portion of a vertical cross section that passes through the vertex equivalent section is formed in an arc shape. The inner surface includes a curve equivalent section continuous with the vertex equivalent section. The second attachment shaft retaining member retains the attachment shaft with the shaft lower end portion abutted onto at least one of the vertex equivalent section and the curve equivalent section.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

In the following drawings, in order to make each configuration easy to understand, the scale, the number and the like may be different in each structure and the actual structures. An exemplary embodiment of an autonomously navigating vehicle of the disclosure is described below with reference to the drawings. The autonomously navigating vehicle (hereinafter called "vehicle") is implemented as a lawnmower.

<Overall Configuration of Autonomously Navigating Vehicle 10>

Figure 1:
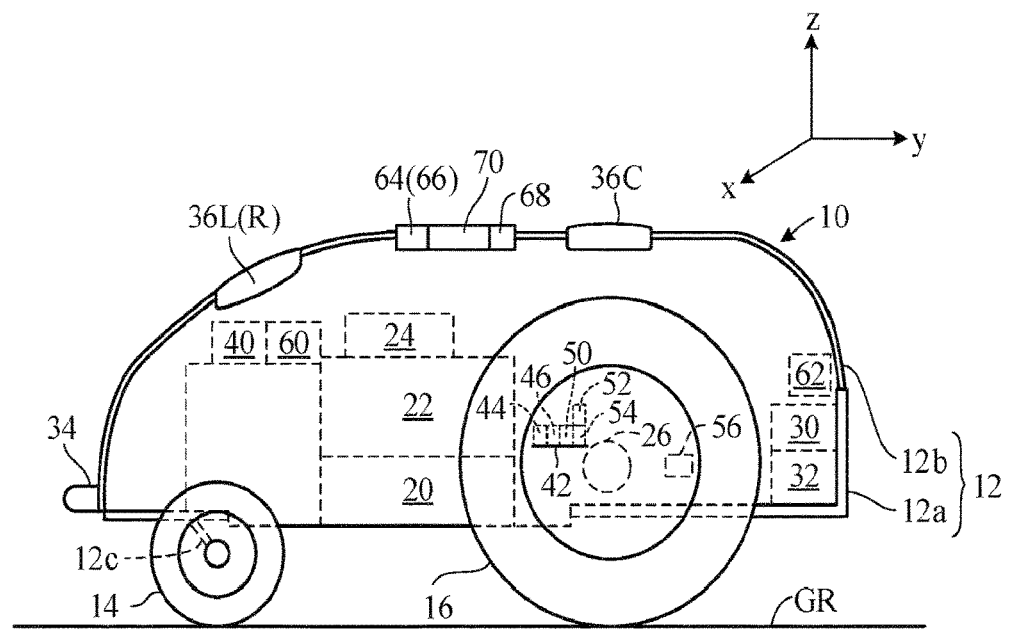
FIG. 1 is a conceptual diagram showing an overview of an autonomously navigating vehicle according to an exemplary embodiment of the disclosure.
Figure 2:
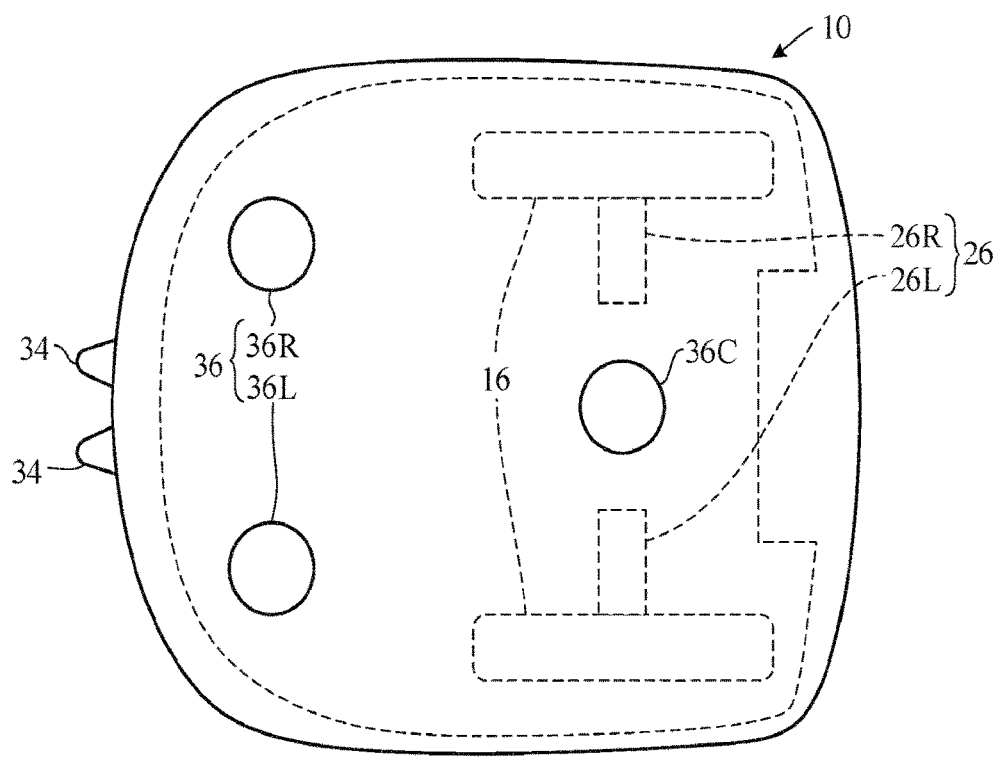
FIG. 2 is a top view of the autonomously navigating vehicle of FIG. 1.

FIG. 1 is a conceptual diagram showing an overview of an autonomously navigating vehicle. According to an exemplary embodiment of the disclosure, the autonomously navigating vehicle (hereinafter called "vehicle") 10 is equipped with a body 12 that includes a chassis (body frame) 12a and a cover 12b displaceably (or detachably) attached to the chassis 12a, two front wheels 14 of relatively small diameter fixed by stays 12c to left and right sides of the chassis 12a toward its front end in the forward-rearward direction, and with left and right rear wheels 16 of relatively large diameter directly attached to the chassis 12*a* toward its rear end.

A blade for lawnmower (work unit, specifically rotary blade) 20 is attached to near the middle part of the chassis 12*a* of the vehicle 10, and an electric motor (prime mover; hereinafter called "work motor") 22 is installed above the blade 20. The blade 20 is connected to the work motor 22 and is rotationally driven by the work motor 22.

A blade height regulating mechanism 24 manually operable by a user is connected to the blade 20. The blade height regulating mechanism 24 is equipped with a handle and configured to enable the user to regulate vertical height of the blade 20 from ground surface GR by manually turning the handle.

Two electric motors (prime movers; hereinafter called "propulsion motors") 26L and 26R are attached to the chassis 12*a* of the vehicle 10 rearward of the blade 20. The propulsion motors 26L and 26R are connected to the left and right rear wheels 16 and, with the front wheels 14 operating as free wheels, the rear wheels 16, operating as driven wheels, are rotated independently on the left and right sides either normally (rotate to move forward) or reversely (rotate to move backward). The blade 20, work motor 22, propulsion motors 26 and other components are covered by the cover 12*b*.

In this embodiment, the vehicle 10 is of such weight and size as to be portable by the user. An onboard charging unit 30 and an onboard battery 32 connected thereto are housed at the rear of the utility vehicle 10, and two battery charging terminals 34 are attached to the chassis 12*a* so as to project forward from a front end position. The battery charging terminals 34 are connected to the onboard charging unit 30. The work motor 22 and propulsion motors 26 are also connected to and powered by the onboard battery 32.

Left and right magnetic sensors 36L and 36R are installed toward the front end of the body 12 of the vehicle 10 and a single magnetic sensor 36C is installed toward the rear end. The magnetic sensors 36 output signals indicating magnetic field strength.

A contact sensor (first detection unit) 40 is attached to the body 12 to detect contact of the vehicle 10 with buildings, paving stones, people and other obstacles and to detect upward lift of the cover 12*b* from the chassis 12*a* by the user, for example. The contact sensor 40 is explained in detail below.

A housing box installed near the middle of the chassis 12*a* houses a printed circuit board 42 carrying an electronic control unit (control unit; hereinafter called "ECU") 44, which includes a microcomputer equipped with a central processing unit (CPU), input/out (I/O), memory (read-only memory (ROM), electrically erasable programmable read-only memory (EEPROM) and random-access memory (RAM)) and other components.

The printed circuit board 42 is provided thereon, in the vicinity of the ECU 44, with an angular velocity sensor 46 that generates an output indicating angular velocity (yaw rate) about a center-of-gravity z-axis (gravity axis) of the vehicle 10, an acceleration sensor 50 that generates an output indicating acceleration acting on the vehicle 10 in orthogonal three-axis (x, y and z) directions, a direction sensor 52 that generates an output indicating absolute orientation in response to terrestrial magnetism, and a GPS sensor 54 that receives radio waves from GPS satellites and generates an output indicting current position of the vehicle 10.

Wheel speed sensors 56 that generate outputs indicating wheel speeds of the left and right rear wheels 16 are installed near the left and right rear wheels 16 of the vehicle 10.

A current sensor 62 that generates an output indicating consumption of onboard battery 32 current is installed on the onboard battery 32.

The utility vehicle 10 is equipped with a main switch 64 for instructing start of work operation and an emergency stop switch 66 for instructing emergency stop, both of which are operable by the operator. In addition, the top of the cover 12*b* has a large cutaway in which a keyboard, touch panel or other input device 68 is installed for input of instructions and the like by the user, and a display 70 is installed near the input device 68. The input device 68 and the display 70 are connected to the ECU 44, and the display 70 displays working mode and various other information in accordance with instructions from the ECU 44.

Outputs of the magnetic sensors 36, contact sensor 40, angular velocity sensor 46 and other sensors, and the outputs of the main switch 64 and other switches are sent to the ECU 44. Based on these outputs, the ECU 44 applies power from the onboard battery 32 to the propulsion motors 26 and outputs control values to control navigation of the vehicle 10 by controlling operation of the propulsion motors 26.

The ECU 44 detects (recognizes) a working area (working range) AR from the outputs of the magnetic sensors 36 and accordingly applies power to the work motor 22 so as to service the working area AR.

Figure 3:
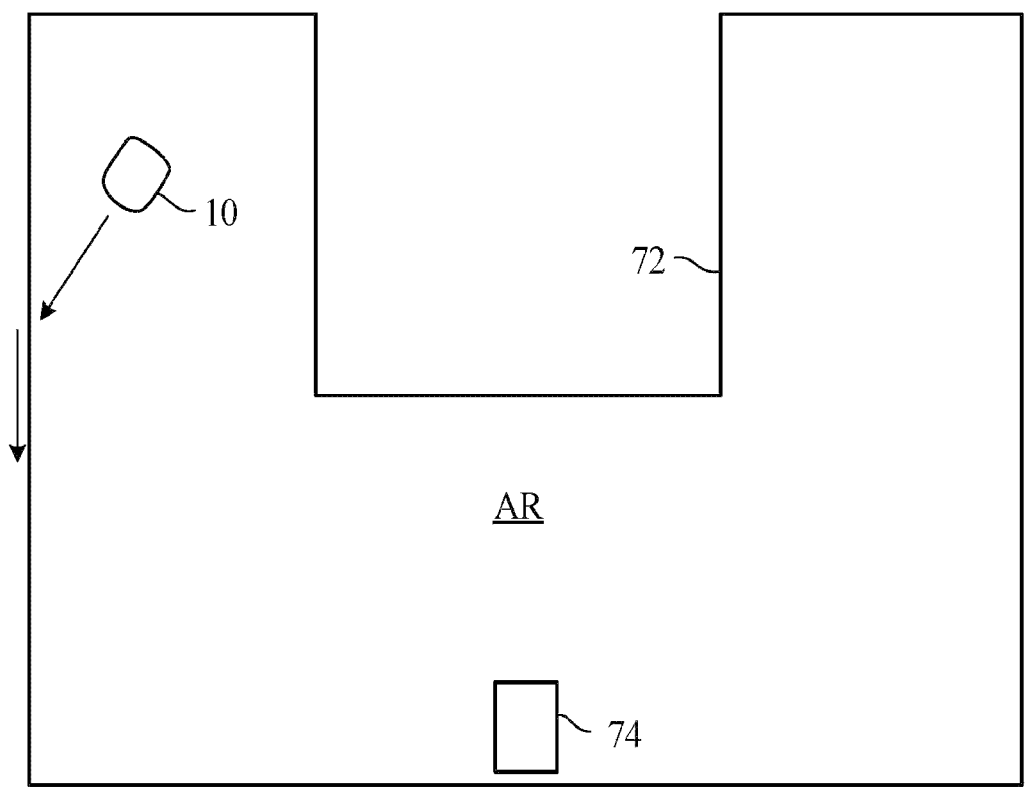
FIG. 3 is an explanatory view of a working area navigated by the autonomously navigating vehicle of FIG. 1.

As shown in FIG. 3, the working area AR is delineated by a boundary wire (electrical wire) 72 laid around its periphery (boundary). A charging station 74 is installed in the working area AR for charging the onboard battery 32 of the vehicle 10. (In FIG. 3, sizes of the vehicle 10 and so on are exaggerated.)

The vehicle 10 of the exemplary embodiment of the disclosure is characterized by a suspension mechanism that connect the chassis 12*a* and the cover 12*b* of the vehicle 10 incorporating the aforesaid configuration. This characterizing aspect is explained with reference to FIG. 4 and later drawings in the following.

Figure 4:
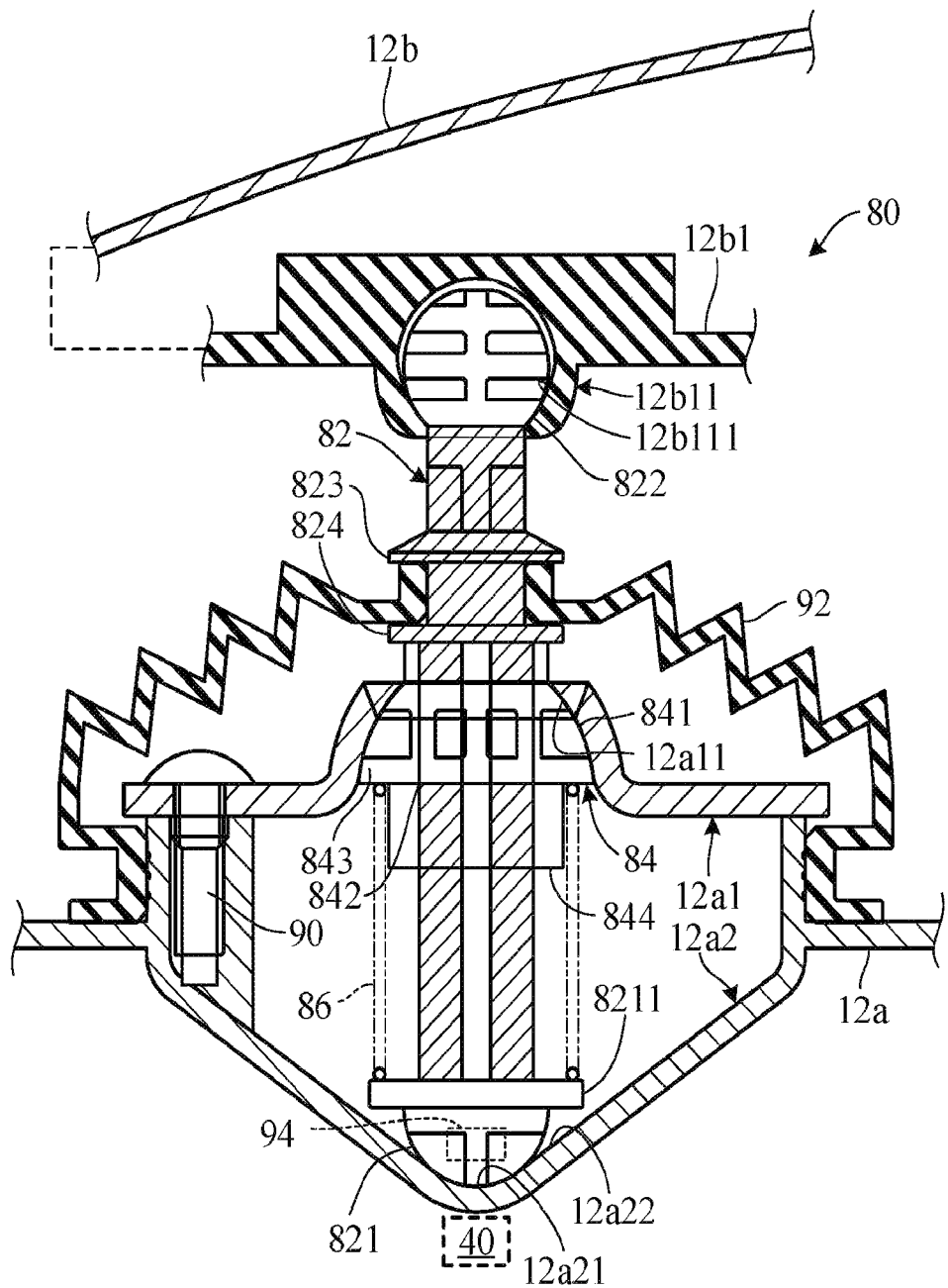
FIG. 4 is a schematic side sectional view of the suspension mechanism that attaches the cover to the chassis of the autonomously navigating vehicle of FIG. 1.
Figure 5:
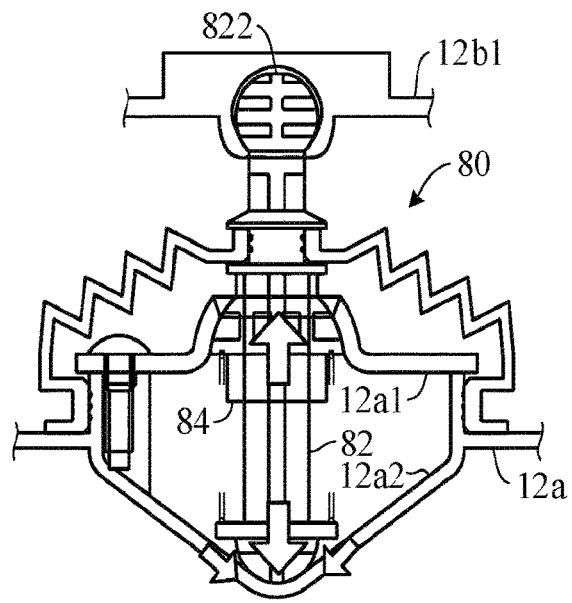
FIG. 5 is a side sectional view showing operation of the suspension mechanism of FIG. 4.
Figure 6:
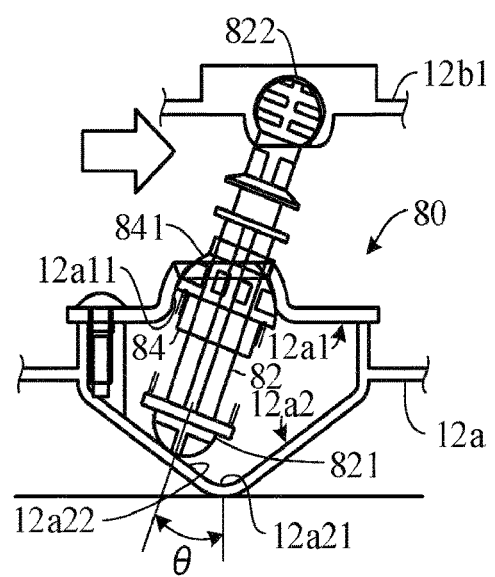
FIG. 6 is a side sectional view similarly showing operation of the suspension mechanism of FIG. 4.
Figure 7:
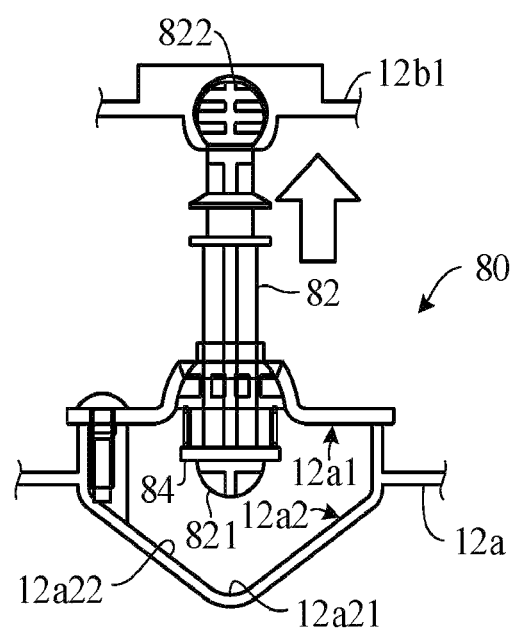
FIG. 7 is a side sectional views similarly showing operations of the suspension mechanism of FIG. 4.

FIG. 4 is a schematic side sectional view of the suspension mechanism, and FIG. 5 to FIG. 7 are side sectional views similar to FIG. 4 showing operations of the suspension mechanism.

The suspension mechanism (hereinafter designated by reference numeral 80) is interposed in gravity axis direction between the chassis 12*a* and cover 12*b* and, as shown FIG. 4, is attached to a lock member 12*b*1 of the cover 12*b* at one end and at another end has at least one attachment shaft 82 to be attached to the chassis 12*a*.

Although not illustrated in the drawings, a total of three suspension mechanisms 80 are installed in the vehicle 10, one above the front wheels 14 and one above each of the left and right rear wheels 16.

As termed in this specification, "gravity axis direction" means direction of gravity axis (vertical axis direction; z-axis direction) in an orthogonal coordinate system when, as shown in FIG. 1, the vehicle 10 is resting on ground surface GR.

As illustrated, the suspension mechanism 80 includes a tube member 84, a first attachment shaft retaining member 12*a*1, a shaft lower end portion 821, a second attachment shaft retaining member 12*a*2, and a biasing member 86.

The tube member 84 is movably attached to the attachment shaft 82, and is formed to have an outer peripheral surface 841 of approximately hemispherical shape surface in side view, but the disclosure is not limited thereto. The tube member 84 is formed in the middle with a through-hole 842 for movably attaching itself to the attachment shaft 82, more exactly for inserting the attachment shaft 82. In addition, the bottom part of the tube member 84 is reduced in diameter, and a rim 843 orthogonal to gravity axis direction is formed there to project horizontally.

The first attachment shaft retaining member 12a1, which is formed on the chassis 12a, has an inside surface 12a11 of approximately hemispherical shape surface in side view and is configured to swingably retain the attachment shaft 82 by abutting the outer peripheral surface 841 of the tube member 84 on the inside surface 12a11. The inside surface 12a11 of the first attachment shaft retaining member 12a1 is formed to have a shape corresponding to the outer peripheral surface 841 of the tube member 84 (i.e., to have a complementary shape).

Thus, the first attachment shaft retaining member 12a1 is connected with the tube member 84 by a ball joint structure, while, as shown in FIG. 6 and FIG. 7, swingably (and movably) retains the attachment shaft 82 between the chassis 12a and the cover 12b (more exactly, between the lock member 12b1 of the cover 12b and the chassis 12a located thereunder).

The shaft lower end portion 821 is provided at lowermost part of the attachment shaft 82 in the gravity axis direction and is configured to exhibit an approximately slip surface shape in side view. More explicitly, the slip surface shape of the shaft lower end portion 821 is formed to exhibit an approximately hemispherical shape surface in side view.

The top part of the shaft lower end portion 821 is expanded in diameter, and a rim 8211 formed there orthogonal to gravity axis direction to project in horizontal direction faces the rim 843 of the tube member 84 in gravity axis direction. The shaft lower end portion 821 may be provided integrally with the attachment shaft 82 or be provided as a separate body.

The second attachment shaft retaining member 12a2 is provided on the chassis 12a below the first attachment shaft retaining member 12a1 in gravity axis direction and is configured to have a vertex equivalent section 12a21 and an inner surface including a curve equivalent section 12a22 continuous with the vertex equivalent section 12a21. The attachment shaft 82 is retained by abutting the shaft lower end portion 821 of approximately slip surface shape in side view on either the vertex equivalent section 12a21 or the curve equivalent section 12a22 of the second attachment shaft retaining member 12a2.

The biasing member 86 actually includes a compression coil elastically interposed between the tube member 84 and the shaft lower end portion 821, specifically between the rim 843 of the tube member 84 and the rim 8211 of the shaft lower end portion 821 to urge the tube member 84 and shaft lower end portion 821 away from each other, i.e., so as to bias them vertically in gravity axis direction. A skirt 844 is provided under the rim 843 of the tube member 84 for aligning the biasing member 86 at the illustrated vertical position.

As shown in FIG. 4, the first attachment shaft retaining member 12a1 and second attachment shaft retaining member 12a2 are joined by screws or other joining members 90. For simplicity of illustration, only one joining member 90 is shown in FIG. 4.

As the joining members 90 suffice insofar as able to join the first attachment shaft retaining member 12a1 and second attachment shaft retaining member 12a2, they may instead be caulking members or the like.

The suspension mechanism 80 is additionally equipped with a shaft upper end portion 822 and a third attachment shaft retaining member 12b11.

The shaft upper end portion 822 is provided at uppermost part of the attachment shaft 82 in the gravity axis direction and is configured to exhibit an approximately spherical surface shape surface in side view, actually to be formed as a sphere. The shaft upper end portion 822 can be provided integrally with the attachment shaft 82 or be provided as a separate body.

The third attachment shaft retaining member 12b11 is installed in the lock member 12b1 of the cover 12b and is in fact enclosed by the lock member 12b1. It has an inside surface 12b111 of approximately spherical surface shape in side view, and the attachment shaft 82 is swingably retained by abutting the shaft upper end portion 822 of approximately spherical surface shape in side view on the inside surface 12b111.

More specifically, a cavity is formed in the lock member 12b1 and the shaft upper end portion 822 is fitted in the cavity. The cavity is formed with the inside surface 12b111 of approximately spherical surface shape in side view corresponding (i.e., complementary) to the shaft upper end portion 822 of approximately spherical surface in side view.

Thus, the third attachment shaft retaining member 12b11 and the shaft upper end portion 822 are connected by a ball joint structure, while, as shown in FIG. 6 and FIG. 7, the attachment shaft 82 is swingably retained between the chassis 12a and the cover 12b (more exactly, between the chassis 12a and the lock member 12b1 of the cover 12b).

Further, as well illustrated in FIG. 4, a waterproofing boot 92 made of rubber or other waterproof material is bridged between the shaft upper end portion 822 of the attachment shaft 82 and both the attached position of the tube member 84 and the chassis 12a, whereby from the third attachment shaft retaining member 12b11 to the chassis 12a is covered by the boot 92.

For this, two vertically spaced-apart flanges 823 and 824 projecting in horizontal direction orthogonally to gravity axis direction are provided below the position where the attachment shaft 82 is provided with the third attachment shaft retaining member 12b11, and the boot 92 is attached between a recess formed between the flanges 823, 824 and an outer wall near the position where the first and second attachment shaft retaining members 12a1 and 12a2 of the chassis 12a are joined. As the waterproof boot 92 therefore covers from the third attachment shaft retaining member 12b11 across to the chassis 12a, invasion of moisture therebetween is prevented.

Moreover, a ferromagnetic magnetic body 94 including of a permanent magnet or the like is installed in the vicinity of the shaft lower end portion 821 of the attachment shaft 82, and a contact sensor (first detector) 40 including a magnetic sensor is installed at the gravity axis direction bottom of the chassis 12a. The suspension mechanism 80 is made of synthetic resin material, and the cover 12b and chassis 12a are also made of synthetic resin.

Output of the contact sensor 40 is sent to the ECU 44, where it is compared with an appropriate threshold to detect movement of the attachment shaft 82 in horizontal direction orthogonal to gravity axis direction, and displacement between the cover 12b and chassis 12a is detected based the comparison result to thereby detect contact of the vehicle 10 with and an obstacle. In a case that the contact of the vehicle 10 with an obstacle is detected, the ECU 44 is configured to control the propulsion motors 26 so that the propulsion motors 26 turn and change the traveling direction of the vehicle 10 when the contact of the vehicle 10 with an obstacle is detected.

In addition, a magnetic body including a permanent magnet or a to-be-detected member such as a metal part is disposed at the cover 12b, and a lift sensor (second detector) 60 including a magnetic sensor is installed at the chassis 12a. According to the exemplary embodiment of the disclosure, the second detector 60 is configured to detect an upward lift of the cover 12b in gravity axis direction based on the movement of the attachment shaft 82 in gravity axis direction, whereby, in addition to realizing the aforesaid effects, that the cover 12b was lifted may be detected.

Output of the lift sensor 60 is also sent to the ECU 44, where it is compared with an appropriate threshold value to detect movement of the attachment shaft 82 in gravity axis direction, and whether the cover 12b has been lifted upward in gravity axis direction by the user, for example, is detected based the comparison result. Furthermore, when the cover 12b is lifted, compared with the condition when there is a contact with an obstacle, since a difference in the displacement amount, the displacement direction and the displacement time of the cover 12b may be induced, it is also possible that the upward lift is detected by the variation of the output signal of the contact sensor 40, rather than the output signal of the lift sensor 60. Namely, the upward lift of the cover 12b may be detected not only by the lift sensor 60, the variation of the output signal of the contact sensor 40 may also be used in the detecting of the upward lift. When the upward lift is detected, the ECU 44 is configured to control the work motor 22 to stop the operating process, namely the work motor 22 may stop the operation when the upward lift is detected.

Operation (action) of the suspension mechanism 80 according to this embodiment is explained with reference to FIG. 5 to FIG. 7 in the following.

When no external force acts on the cover 12b relative to the chassis 12a, the suspension mechanism 80 acts such that the attachment shaft 82 is retained in initial state parallel to gravity axis direction, as shown in FIG. 5, because the tube member 84 and shaft lower end portion 821 are biased away from each other by the biasing member 86. When no external force acts on the cover 12b relative to the chassis 12a, the suspension mechanism 80 operates to retain the attachment shaft 82 in initial state parallel to gravity axis direction, as shown in FIG. 5, by action of the biasing member 86 urging the tube member 84 and shaft lower end portion 821 away from each other.

Namely, the suspension mechanism 80 operates to capture and immobilize the shaft lower end portion 821 at the vertex equivalent section 12a21 of the second attachment shaft retaining member 12a2, thereby retaining the attachment shaft 82 by means of the vertex equivalent section 12a21.

On the other hand, as shown in FIG. 6, when a horizontal external force acts on the cover 12b relative to the chassis 12a, such as when the vehicle 10 strikes an obstacle, the suspension mechanism 80 operates, during swing of the upper end of the attachment shaft 82 by the first attachment shaft retaining member 12a1 as shown in FIG. 6, to retain the attachment shaft 82 as the shaft lower end portion 821 of slip shape escapes from the vertex equivalent section 12a21 of the second attachment shaft retaining member 12a2 and moves along the curve equivalent section 12a22.

Further, when the user, for example, applies an external force to move the cover 12b in gravity axis direction upward relative to the chassis 12a, the suspension mechanism 80 operates, as shown in FIG. 7, to move the attachment shaft 82 upward in gravity axis direction until the tube member 84 moves relatively downward along the attachment shaft 82 to abut on the first attachment shaft retaining member 12a1 at limit position.

This rise limit of the attachment shaft 82 is determined by axial lengths of the attachment shaft 82 and tube member 84. Further, swing angle θ of the attachment shaft 82 in the second attachment shaft retaining member 12a2 (FIG. 6) is limit of angle of abutment between the tube member 84 and first attachment shaft retaining member 12a1, so that desired swing angle may be realized by appropriately deciding shape of these members.

<Configuration of Second Attachment Shaft Retaining Member 12a2>

Configuration (characterized shapes for different functions and performances of the suspension mechanism 80) of the second attachment shaft retaining member 12a2 of the suspension mechanism 80 according to this embodiment is explained with reference to FIG. 4 to FIG. 9 in the following.

Figure 8:
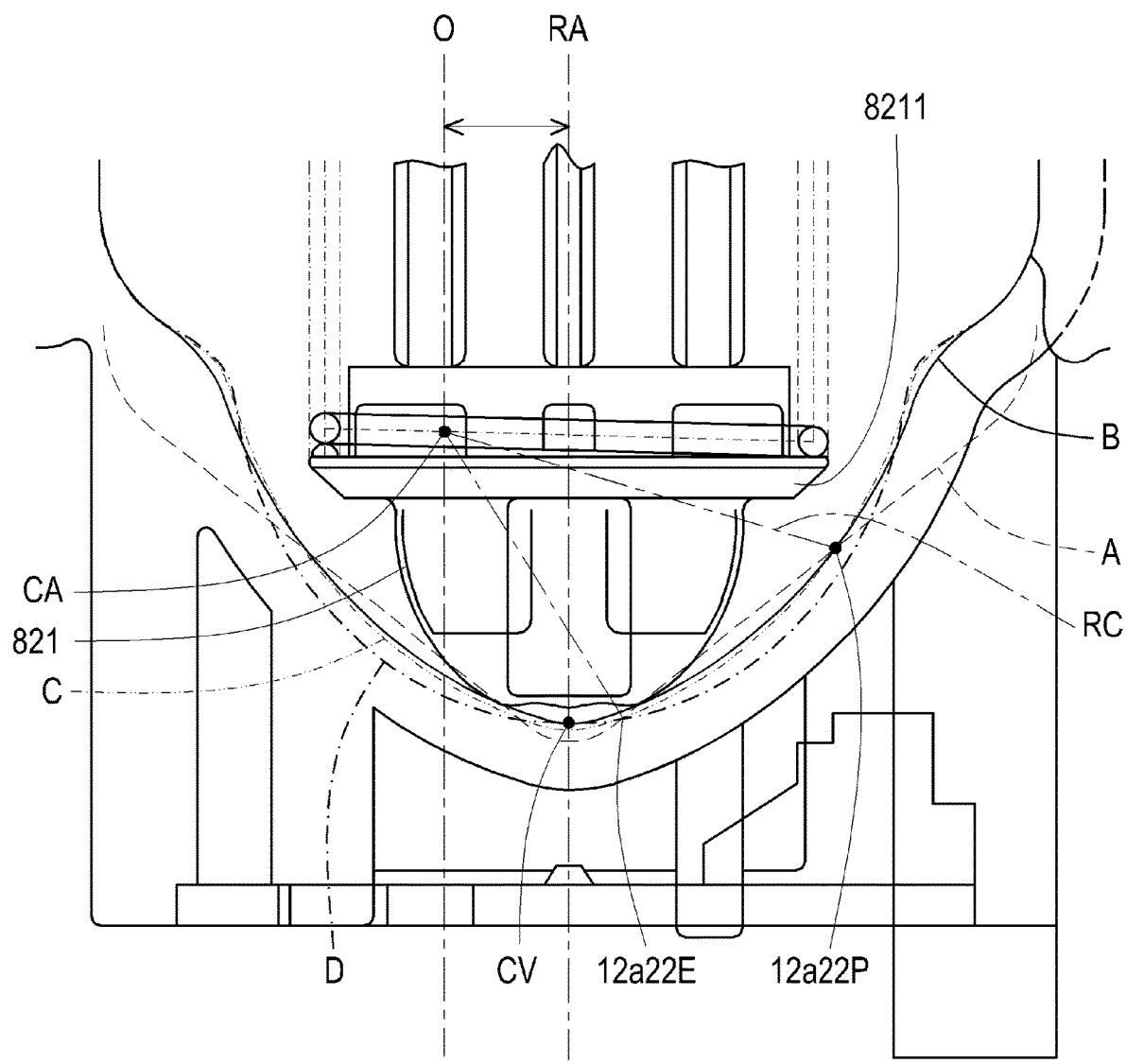
FIG. 8 is a schematic view showing different configurations of the second attachment shaft retaining member of the suspension mechanism of FIG. 4.
Figure 9:
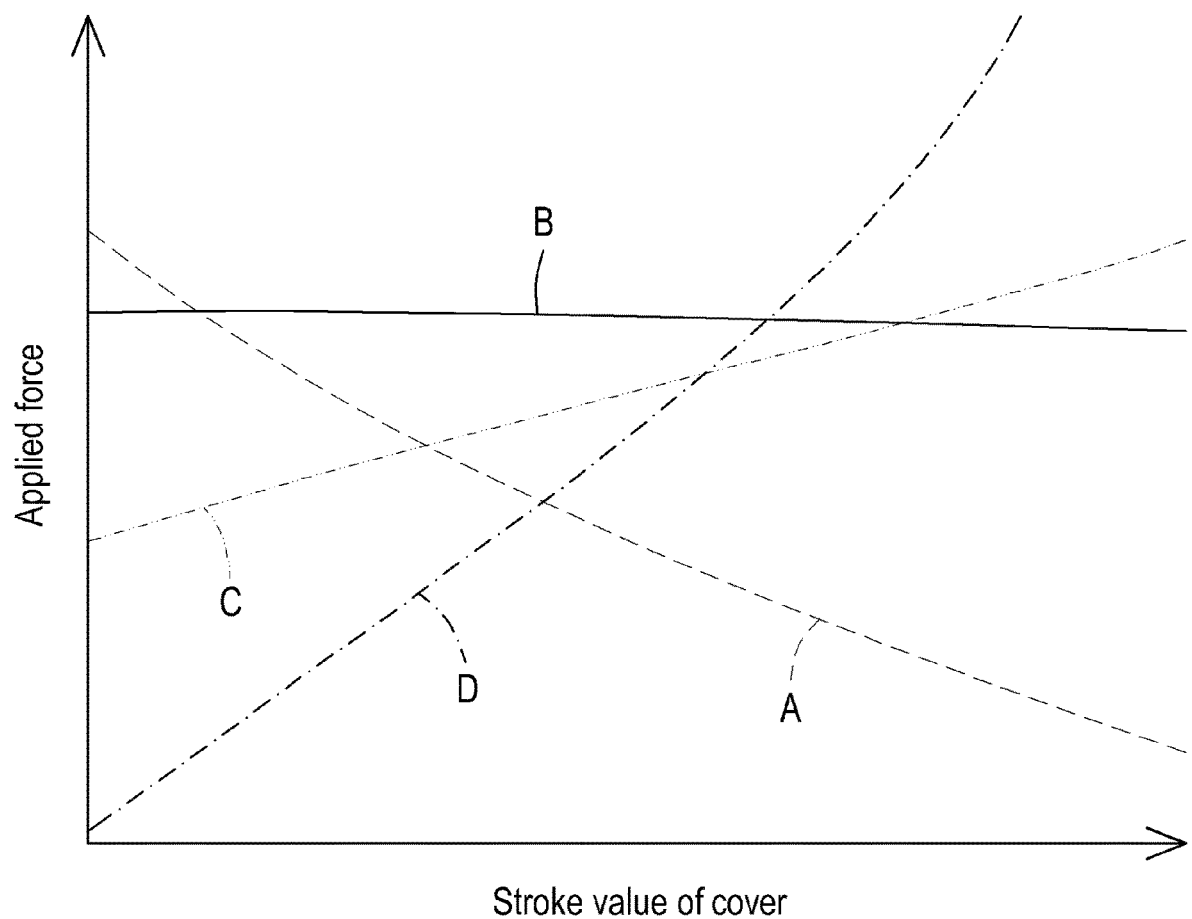
FIG. 9 is a schematic graph showing the relationship between the applied force of the attachment shaft and the stroke value of the cover corresponding to the different configurations shown in FIG. 8.

FIG. 8 is a schematic view showing different configurations of the second attachment shaft retaining member of the suspension mechanism of FIG. 4. For the sake of comprehension and simpleness, four curves are conceptually shown in FIG. 8 with four different appearances. Herein, in FIG. 8, the curve shown in a dashed line 12a2A, the curve shown in a solid line 12a2B, the curve shown in a double-dotted line 12a2C, and the curve shown in a one-dotted line 12a2D, respectively shows the profile of the second attachment shaft retaining member 12a2 viewing in the vertical cross section of the attachment shaft 82. FIG. 9 is a schematic graph showing the relationship between the applied force of the attachment shaft and the stroke value of the cover corresponding to the different configurations shown in FIG. 8. Herein, in FIG. 9, the curve shown in a dashed line A corresponds to the dashed line 12a2A of FIG. 8, the curve shown in a solid line B corresponds to the solid line 12a2B of FIG. 8, the curve shown in a double-dotted line C corresponds to the double-dotted line 12a2C of FIG. 8, and the curve shown in a one-dotted line D corresponds to the one-dotted line 12a2D of FIG. 8, respectively.

As shown in FIG. 4, FIG. 8 and FIG. 9, the second attachment shaft retaining member 12a2 includes a vertex equivalent section 12a21 and an inner surface 12a22 defined as a portion of a vertical cross section that passes through the vertex equivalent section 12a21 is formed in an arc shape. The inner surface 12a22 includes a curve equivalent section 12a22 continuous with the vertex equivalent section 12a21, and the second attachment shaft retaining member 12a2 retains the attachment shaft 82 with the shaft lower end portion 821 abutted onto at least one of the vertex equivalent section 12a21 and the curve equivalent section 12a22. The curve equivalent section 12a22 of a shape corresponding to the shaft lower end portion 821 of approximately slip surface shape in side view, more exactly of a shape on which the shaft lower end portion 821 may move smoothly, and the vertex equivalent section 12a21 capable of immobilizing the shaft lower end portion 821.

Thus, the second attachment shaft retaining member 12a2 is configured to receive the shaft lower end portion 821 on one or the other of the vertex equivalent section 12a21 and the curve equivalent section 12a22, i.e., so as to retain the attachment shaft 82 with the shaft lower end portion 821 immobilized by the vertex equivalent section 12a21 or allowed to slip by the curve equivalent section 12a22.

The shape of the shaft lower end portion 821 is not limited to approximately hemispherical shape in side view but may be of any shape insofar as capable of moving smoothly on the curve equivalent section 12a22 of the second attachment shaft retaining member 12a2.

As shown in FIG. 4, FIG. 8 and FIG. 9, the configuration of the tip portion of the second attachment shaft retaining member 12a2 is an important part in contribution to the load or force generated when the attachment shaft 82 is tilted, since it is possible to result different performances of cushioning (for example, the restoring force of the shaft when the vehicle strikes an obstacle) and retaining (for example, the retaining force or the initial force or the stiffness of the shaft in the initial state) depending on different configurations (FIG. 8 and FIG. 9 show four different configurations and their corresponding performances).

In FIG. 8 and FIG. 9, the dashed line 12a22A is the profile of the tip portion of the second attachment shaft retaining member 12a2 that has a similar configuration shown in FIG. 4, in which the curve equivalent section 12a22 of the inner surface is formed as a flat surface on which the shaft lower end portion 821 to contact with. As shown in FIG. 8 and FIG. 9, the curve equivalent section 12a22 has a shape of smallest curvature (namely having the largest radius of curvature), compared to other three profiles (the solid line 12a22B, the double-dotted line 12a22C and the one-dotted line 12a22D) with respect to the center of the vertex equivalent section 12a21. The corresponding dashed line A of the dashed line 12a22A shows that the configuration has the greatest applied force and the smallest stroke value of the cover 12b.

In FIG. 8 and FIG. 9, regarding the solid line 12a22B and the solid line B, compared to the dashed line 12a22A of FIG. 8 and the dashed line A of FIG. 9, the curve equivalent section 12a22 has a higher stroke value of the cover 12b and a smaller applied force of the attachment shaft 82, and has a smaller offset value (the offset value is explained hereafter). The curve equivalent section 12a22 is configured that the curve equivalent section 12a22 includes a vertex side end portion 12a22E continuous with the vertex equivalent section 12a21 and a peripheral side end portion 12a22P that is an outer periphery of the inner surface 12a22. In the vertical cross section that passes through the vertex equivalent section 12a21, the curve equivalent section 12a22 is formed by a circular arc having a predetermined radius (the radius of curvature RC) and passing through the vertex side end portion 12a22E and the peripheral side end portion 12a22P. In other words, the circular arc (namely the curve equivalent section 12a22) may be referred to be the arc that is drawn from the vertex side end portion 12a22E to the peripheral side end portion 12a22P in the vertical cross section. The inner surface of the second attachment shaft retaining member 12a2 is defined by rotating the circular arc about a rotation axis RA that passes through a center CV of the vertex equivalent section 12a21 in the vertical cross section, as shown in FIG. 8. In addition, the solid line 12a22B represents that the inner surface is configured that the curvature of the arc shape (the circular arc of the curve equivalent section 12a22) in the vertical cross section decreases, with respect to the vertex equivalent section 12a21, from the outer periphery of the inner surface toward the vertex equivalent section 12a21.

Furthermore, as shown in FIG. 8, a center CA of the circular arc is located on an opposite side of the circular arc with the rotation axis RA as a boundary. Herein, it is regarded as the offset line O in which the center CA of the circular arc exists is offset from the rotation axis RA, so as to modify the configuration of the curve equivalent section 12a22 to have a larger curvature, instead of being a very flat surface on which the shaft lower end portion 821 to contact with as like the configuration of the curve equivalent section 12a22 shown by the dashed line 12a22A.

In such configuration, regarding the configuration of the curve equivalent section 12a22, the value of the offset (the distance between offset line O and the rotation axis RA) and the value of the curvature (the radius of curvature RC) may be selectively adjusted as required, for particular countermeasure with respect to the cushioning performance and the retaining performance of the vehicle. By setting the configuration of the curve equivalent section 12a22, an appropriate load may be set according to the displacement value of the attachment shaft in accordance with the radius of curvature RC.

Moreover, another two examples of the curve equivalent section 12a22 having different functions due to different configurations of the curve equivalent section 12a22 are shown as follows. In FIG. 8 and FIG. 9, regarding the double-dotted line 12a22C and the double-dotted line C, compared to the solid line 12a22B of FIG. 8 and the solid line B of FIG. 9, the curve equivalent section 12a22 has a higher stroke value of the cover 12b and a smaller applied force of the attachment shaft 82, and has a smaller offset value. The double-dotted line 12a22C represents that the inner surface is configured that a curvature of the arc shape in the vertical cross section decreases from the vertex equivalent section 12a21 toward the outer periphery of the inner surface.

In FIG. 8 and FIG. 9, regarding the one-dotted line 12a22D and the one-dotted line D, compared to the double-dotted line 12a22C of FIG. 8 and the double-dotted line C of FIG. 9, the curve equivalent section 12a22 has a higher stroke value of the cover 12b and a smaller applied force of the attachment shaft 82, and has a smaller offset value.

In such configuration, in order to modify the configuration of the curve equivalent section 12a22 as actual requirement, the value of the offset (the distance between offset line O and the rotation axis RA) and the value of the curvature (the radius of curvature RC) may be selectively adjusted, for particular countermeasure with respect to the cushioning performance and the retaining performance of the vehicle.

According to the exemplary embodiment of the disclosure, the autonomously navigating vehicle 10 includes a plurality of the suspension mechanisms 80, for example includes three suspension mechanisms 80 with one attached on the front wheel and two attached on the rear wheels as mentioned above. The three suspension mechanisms 80 attached in different places of the vehicle 10 may have different configurations of the second attachment shaft retaining member 12a2, namely, the inner surface is configured that a curvature of the arc shape in the vertical cross section differs depending on the plurality of the suspension mechanisms 80. For example, the suspension mechanism 80 having a cushioning performance higher than a retaining performance, for example the curve equivalent section 12a22 shown with the double-dotted line 12a22C in FIG. 8, may be mounted on the front part (for example, the front wheels 14) of the vehicle 10, so that the load of the attachment shaft 82 increases according to the displacement of the attachment shaft 82 for ensuring of cushioning the impact in the forward-rearward direction; whereas the suspension mechanism 80 having a retaining performance higher than a cushioning performance, for example the curve equivalent section 12a22 shown with the solid line 12a22B in FIG. 8, may be mounted on the back part (for example, on each rear wheel 16) of the vehicle 10, so that the load at a position where the displacement of the attachment shaft 82 is comparatively smaller may be increased for avoiding erroneous detection of the obstacle detection function. In such configuration, suspension mechanisms 80 with different functions may be chosen to be appropriately mounted onto different parts of the vehicle 10 as actual requirement.

On the other hand, as for the suspension mechanism having the configuration of the curve equivalent section 12a22 shown with the one-dotted line 12a22D, which has the largest stroke value of the cover 12b (the greatest cushioning performance) among the four examples, may be appropriate to be used when the vehicle 10 is traveling on a comparatively even roads (possibility of obstacle collision may be very few), since the initial force may be comparatively lower and the load of displacement may be comparatively larger.

As illustrated in the embodiment of the disclosure, the curve equivalent section includes a vertex side end portion continuous with the vertex equivalent section and a peripheral side end portion that is an outer periphery of the inner surface. In the vertical cross section that passes through the vertex equivalent section, the curve equivalent section is formed by a circular arc having a predetermined radius and passing through the vertex side end portion and the peripheral side end portion. The inner surface is defined by rotating the circular arc about a rotation axis that passes through a center of the vertex equivalent section in the vertical cross section. As such, an appropriate load may be set according to the displacement value of the attachment shaft in accordance with the radius of the circular arc.

As illustrated in the embodiment of the disclosure, the curve equivalent section is configured that the center of the circular arc is located on the opposite side of the circular arc with the rotation axis as a boundary. As such, the erroneous detection may be prevented by setting a higher initial load of the attachment shaft in the initial state.

As illustrated in the embodiment of the disclosure, the inner surface is configured that a curvature of the arc shape in the vertical cross section decreases, with respect to the vertex equivalent section, from an outer periphery of the inner surface toward the vertex equivalent section. As such, in a case that an obstacle collides with the vehicle, the load of the attachment shaft increases according to the displacement of the attachment shaft, thus the cushioning performance at time of collision is enhanced and the impact transmitted to the chassis may be reduced.

As illustrated in the embodiment of the disclosure, the inner surface is configured that the curvature of the arc shape in the vertical cross section decreases from the vertex equivalent section toward the outer periphery of the inner surface. As such, the load at a position where the displacement of the attachment shaft is comparatively smaller may be increased, and the erroneous detection of the obstacle detection function may be prevented even in a case that the vehicle is traveling on rough roads.

As illustrated in the embodiment of the disclosure, the inner surface is configured that the curvature of the arc shape in the vertical cross section differs depending on the vertical cross section is extending in the forward-rearward direction of the traveling direction and the vertical cross section is extending in the left-right direction of the traveling direction. As such, an appropriate load may be set even when the possibility of collision with an obstacle and the impact of the obstacle collision differ depending on the impact applied from the forward-rearward direction and the left-right direction.

As illustrated in the embodiment of the disclosure, the suspension mechanism of the autonomously navigating vehicle further includes a biasing member elastically interposed between the tube member and the shaft lower end portion to bias the tube member and the shaft lower end portion away from each other. As such, the chassis and the cover can be reliably connected through the suspension mechanism and retaining performance of the attachment shaft can be enhanced, thereby configuration of retaining the attachment shaft may effectively inhibit vibration of the cover and enables reduction of vehicle running noise.

As illustrated in the embodiment of the disclosure, the autonomously navigating vehicle incudes a plurality of the suspension mechanisms, and the inner surface is configured that the curvature of the arc shape in the vertical cross section differs depending on the plurality of the suspension mechanisms. As such, an appropriate load may be set depending on the configuration positions of the suspension mechanisms of the vehicle. For example, the suspension mechanism having a cushioning performance higher than a retaining performance may be mounted on the front part (for example, the front wheel) of the vehicle, so that the load of the attachment shaft increases according to the displacement of the attachment shaft for ensuring of cushioning the impact in the forward-rearward direction; whereas the suspension mechanism having a retaining performance higher than a cushioning performance may be mounted on the back part (for example, the rear wheels) of the vehicle, so that the load at a position where the displacement of the attachment shaft is comparatively smaller may be increased for avoiding erroneous detection of the obstacle detection function. In such configuration, suspension mechanisms with different functions may be chosen to be appropriately mounted onto different parts of the vehicle as actual requirement.

As illustrated in the embodiment of the disclosure, the predetermined radius of the circular arc of the curve equivalent section is set so that a load applied to the attachment shaft is constant with respect to a displacement value of the shaft lower end portion. As such, impact or contact with obstacle may be accurately detected.

In light of the foregoing, as illustrated in the embodiment of the disclosure, the autonomously navigating vehicle is equipped with a suspension mechanism interposed between the chassis and the cover. The suspension mechanism is provided with a first attachment shaft retaining member and a second attachment shaft retaining member that detects when an obstacle comes into contact (or impact) with the vehicle. The disclosure describes the portion of the second attachment shaft retaining member which is provided with a contact sensor is designed to have different configurations with their own particular functions, such as the arc shapes in the vertical cross section of the attachment shaft characterized with different curvatures have particular advantages with respect to cushioning performance and retaining performance. According to the disclosure, the angle between the contact surface of the chassis and the shaft, which greatly contributes to the load generated when the shaft is tilted, may be retained in an angle tilted to a certain extent amount from the vertical position even when the shaft is tilted, thus it is possible to maintain a sufficiently high load after the cover is moved. By the configuration of the size of radius of the arc shape and the offset amount between the center of the vertex equivalent section and the rotation axis of the arc shape, it is possible to arbitrarily adjust the retaining force in the set state and the load after the cover is moved, thereby both of the retaining performance and the cushioning performance of the autonomously navigating vehicle is improved according to mounting the suspension mechanisms as required.

The embodiment and example of the disclosure are described above; however, the disclosure is not limited to the above-described embodiment and can be variously modified and altered within the scope of the gist of the disclosure. The embodiment and the modifications thereof are included in the scope and the gist of the disclosure and are included in the disclosure described in the claims and equivalent scopes thereof.

INDUSTRIAL APPLICABILITY

The autonomously navigating vehicle according to this disclosure may be advantageously applied as an unmanned autonomously navigating vehicle.

DESCRIPTION OF SYMBOLS 10 autonomously navigating vehicle (vehicle), 12 body, 12a chassis, 12a1 first attachment shaft retaining member, 12a11 inside surface, 12a2 second attachment shaft retaining member, 12a21 vertex equivalent section, 12a22 curve equivalent section, 12a22E vertex side end portion, 12a22P peripheral side end portion, 12b cover, 12b1 lock member, 12b11 third attachment shaft retaining member, 12b111 inside surface, 14 front wheels, 16 rear wheels, 20 blade, 22 electric motor (work motor), 24 blade height regulating unit, 26 electric motor (propulsion motor), 30 onboard charging unit, 32 onboard battery, 34 battery charging terminals, 36L, 36R, 36C magnetic sensors, 40 contact sensor, 44 electronic control unit (ECU), 46 angular velocity sensor, 50 acceleration sensor, 52 direction sensor, 54 GPS sensor, 56 wheel speed sensor, 60 lift sensor, 62 current sensor, 68 input device, 70 display, 72 boundary wire, 74 charging station, 80 suspension mechanism, 82 attachment shaft, 821 shaft lower end portion, 8211 rim, 822 shaft upper end portion, 823, 824 flanges, 84 tube member, 841 outer peripheral surface, 843 rim, 90 joining member, 92 boot, 94 magnetic body, AR working area

What is claimed is:

1. An autonomously navigating vehicle, equipped with a chassis, a cover, and a suspension mechanism interposed between the chassis and the cover through a lock member at one end, and having at least an attachment shaft attached to the chassis at other end, which vehicle runs on drive wheels attached to the chassis, wherein the suspension mechanism of the autonomously navigating vehicle comprises:
    a tube member that is movably attached to the attachment shaft;
    a first attachment shaft retaining member provided on the chassis to swingably retain the attachment shaft with the tube member;
    a shaft lower end portion provided at lowermost part of the attachment shaft; and
    a second attachment shaft retaining member provided on the chassis below the first attachment shaft retaining member to retain the attachment shaft;
    wherein the second attachment shaft retaining member includes a vertex equivalent section and an inner surface defined as a portion of a vertical cross section that passes through the vertex equivalent section is formed in an arc shape,
    the inner surface includes a curve equivalent section continuous with the vertex equivalent section, and the second attachment shaft retaining member retains the attachment shaft with the shaft lower end portion abutted onto at least one of the vertex equivalent section and the curve equivalent section.

2. The autonomously navigating vehicle according to claim 1, wherein
    the curve equivalent section includes a vertex side end portion continuous with the vertex equivalent section and a peripheral side end portion that is an outer periphery of the inner surface,
    in the vertical cross section that passes through the vertex equivalent section, the curve equivalent section is formed by a circular arc having a predetermined radius and passing through the vertex side end portion and the peripheral side end portion, and
    the inner surface is defined by rotating the circular arc about a rotation axis that passes through a center of the vertex equivalent section in the vertical cross section.

3. The autonomously navigating vehicle according to claim 2, wherein
    a center of the circular arc is located on an opposite side of the circular arc with the rotation axis as a boundary.

4. The autonomously navigating vehicle according to claim 1, wherein
    the inner surface is configured that a curvature of the arc shape in the vertical cross section decreases, with respect to the vertex equivalent section, from an outer periphery of the inner surface toward the vertex equivalent section.

5. The autonomously navigating vehicle according to claim 1, wherein
    the inner surface is configured that a curvature of the arc shape in the vertical cross section decreases from the vertex equivalent section toward an outer periphery of the inner surface.

6. The autonomously navigating vehicle according to claim 1, wherein
    the inner surface is configured that a curvature of the arc shape in the vertical cross section differs depending on the vertical cross section is extending in a forward-rearward direction of a traveling direction and the vertical cross section is extending in a left-right direction of the traveling direction.

7. The autonomously navigating vehicle according to claim 1, wherein the suspension mechanism of the autonomously navigating vehicle further comprises:
    a biasing member elastically interposed between the tube member and the shaft lower end portion to bias the tube member and the shaft lower end portion away from each other.

8. The autonomously navigating vehicle according to claim 1, wherein
    the autonomously navigating vehicle comprises a plurality of the suspension mechanisms, and the inner surface is configured that a curvature of the arc shape in the vertical cross section differs depending on the plurality of the suspension mechanisms.

9. The autonomously navigating vehicle according to claim 2, wherein
    the predetermined radius of the circular arc of the curve equivalent section is set so that a load applied to the attachment shaft is constant with respect to a displacement value of the shaft lower end portion.

* * * * *